Nov. 27, 1934.  E. A. JOHNSTON ET AL  1,982,435
DELAYED DISCHARGE CONTROL FOR WINDROW HARVESTERS
Filed Aug. 30, 1923  4 Sheets-Sheet 2
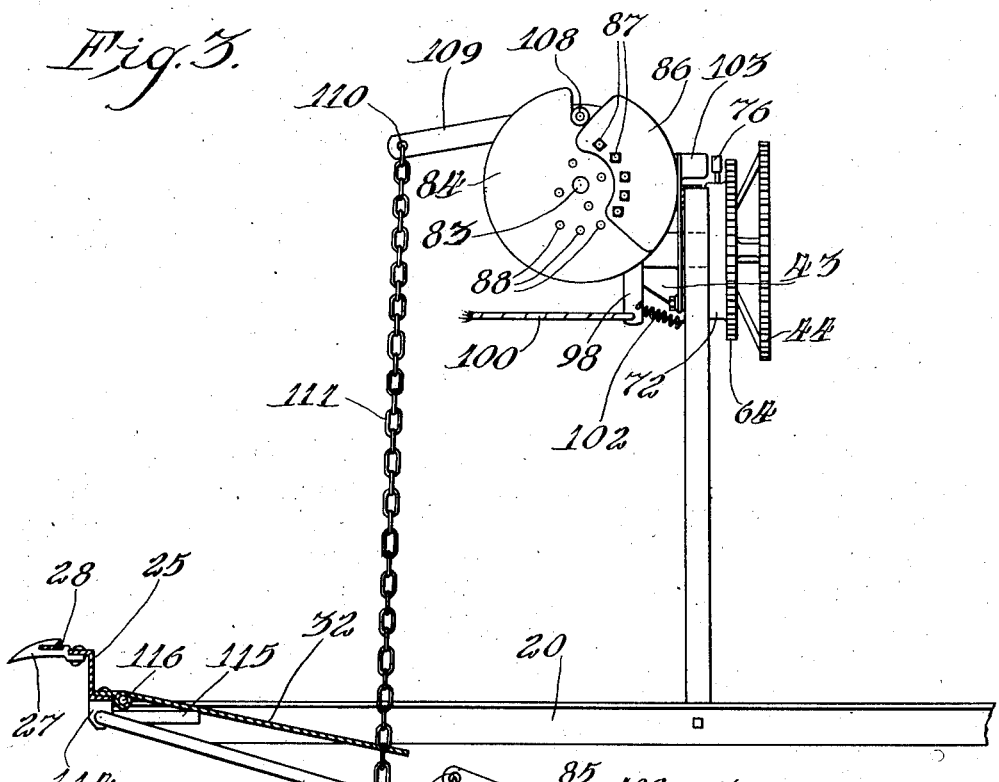
Fig. 3.
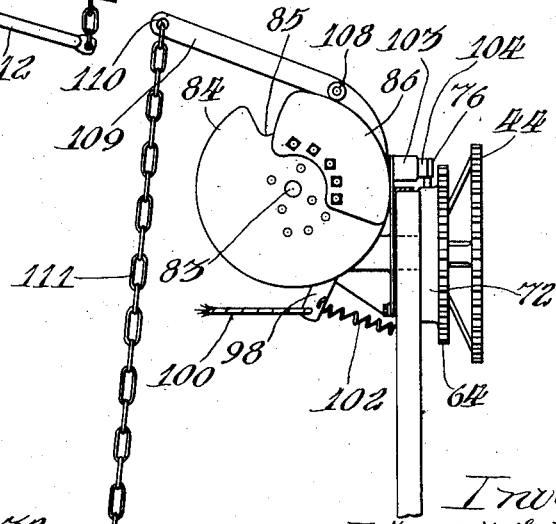
Fig. 4.
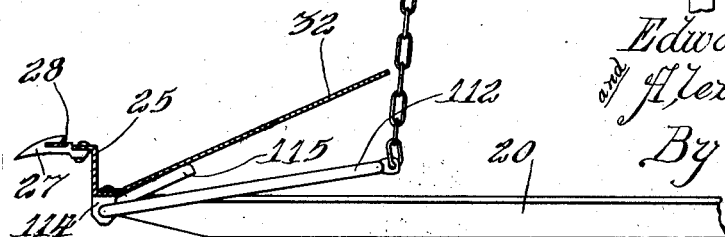
Inventors.
Edward A. Johnston
and Alexius C. Lindgren.
By
Atty.

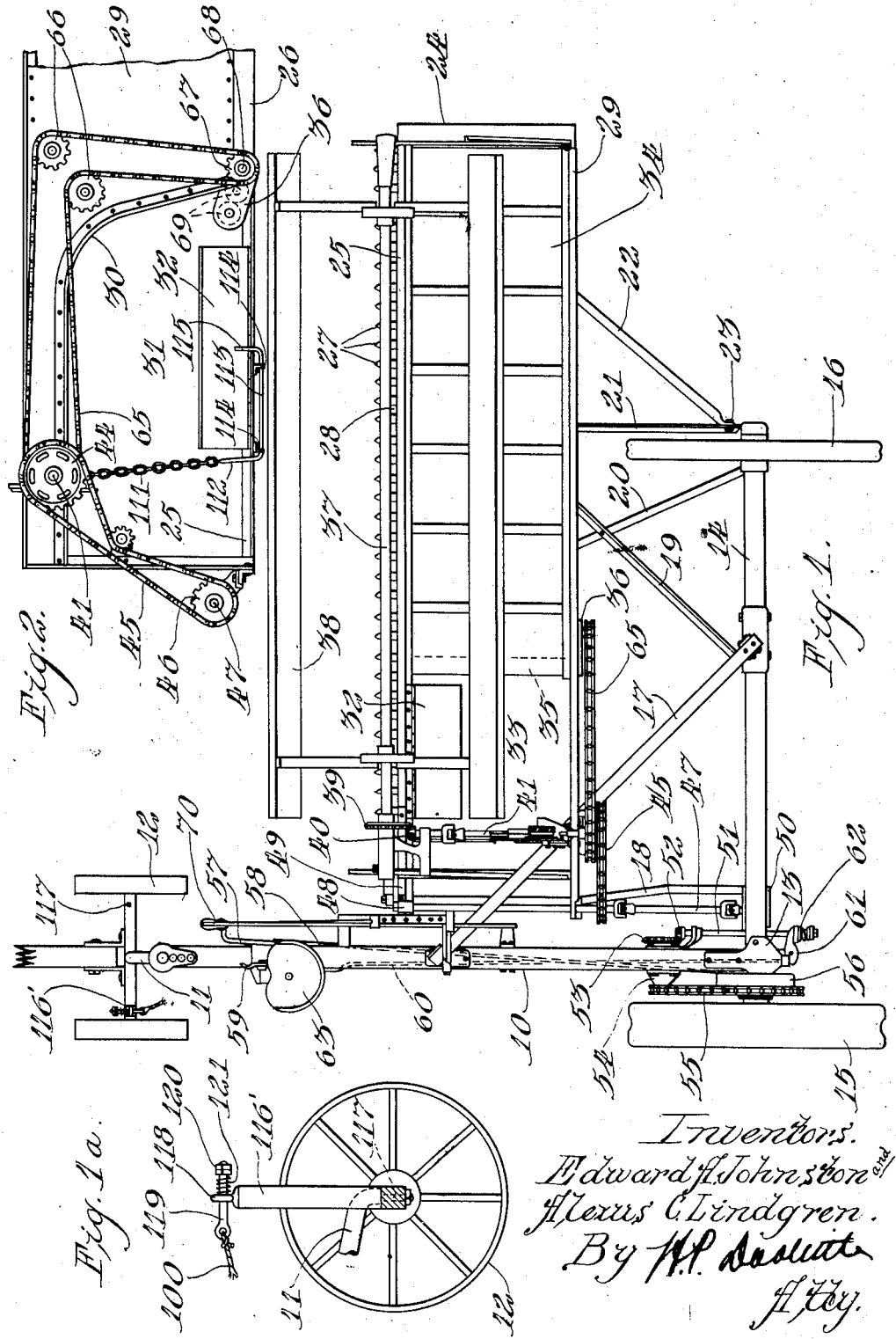

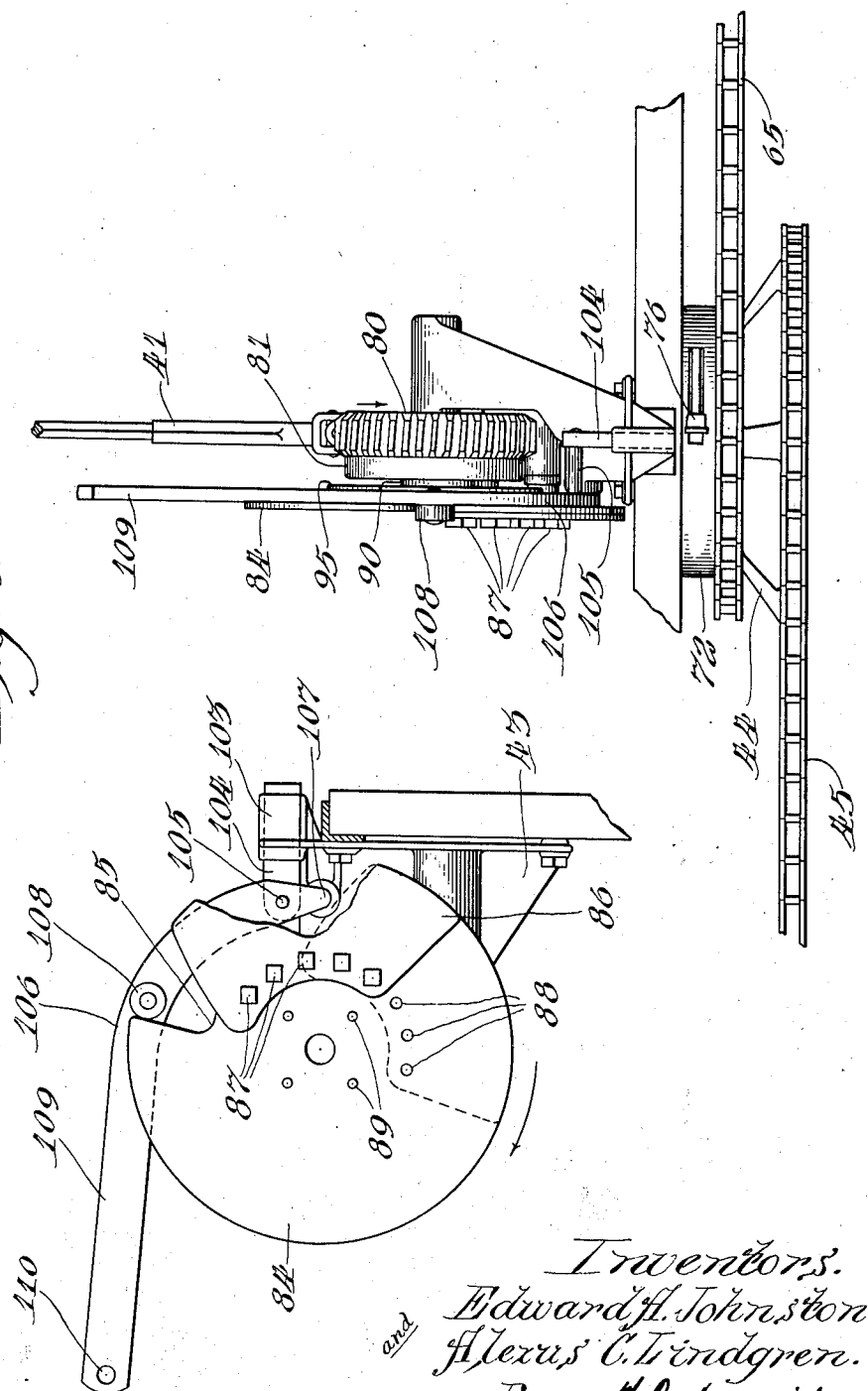

Nov. 27, 1934.  E. A. JOHNSTON ET AL  1,982,435
DELAYED DISCHARGE CONTROL FOR WINDROW HARVESTERS
Filed Aug. 30, 1923  4 Sheets-Sheet 4
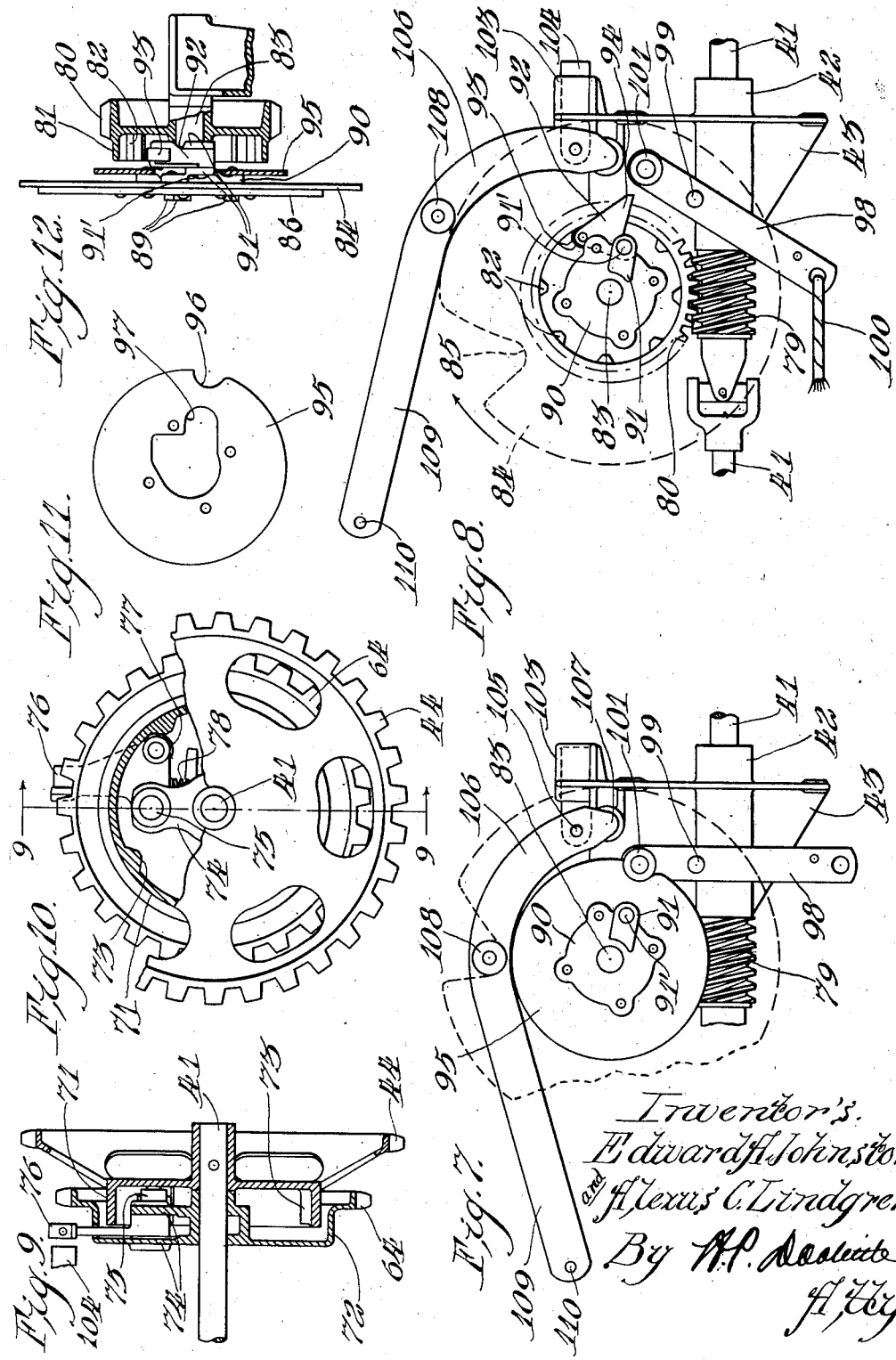

Patented Nov. 27, 1934

1,982,435

UNITED STATES PATENT OFFICE 1,982,435

DELAYED DISCHARGE CONTROL FOR WINDROW HARVESTER

Edward A. Johnston and Alexus C. Lindgren, Chicago, Ill., assignors to International Harvester Company, a corporation of New Jersey Application August 30, 1923, Serial No. 302,922

27 Claims. (Cl. 56—183)

The invention relates to a windrow harvester.

Windrow harvesters are now commonly utilized in the harvesting of grain. These machines cut the grain, and form the same into windrows in which formation the grain will evenly dry. Green weeds will also dry out. This windrowing operation is preliminary to the use of a combination harvester thresher. When the grain has cured in this windrow, it is picked up by a pick-up attachment associated with the harvester thresher. The grain is thus gathered from the windrow and delivered into the harvester thresher for threshing, as is usual when employing harvester threshers.

In the particular form of windrow harvester herein to be disclosed, the grain cut thereby is discharged along a portion of a cutter bar and rearwardly thereof, so that, when opening up a field it is never necessary or, in fact, possible to form the windrow on any uncut grain standing in the field. Furthermore, the type of windrower herein disclosed is provided in back of the cutter bar at that point where the grain is discharged to the rear thereof, with a plate which acts to bend the standing stubble in its path ahead, so that the grain discharged by the windrower is deposited upon this bent-over stubble in a manner effectively causing said stubble to support the windrow well up above the ground where it will best dry out.

Another function of this plate is to prevent a too forceful discharge of the grain onto the stubble, thereby causing the windrow to be laid on top of the bent-over stubble in an orderly, even, manner with the heads of the grain up and best exposed to the action of sun and wind, and leading the windrow to be picked up later with the utmost facility.

Grain fields are as a rule of rectangular shape. In cutting, a harvester starts in one corner at the outside of the field, then travels along one side of the rectangle, makes a right angle turn at the end of that side and along the next adjacent side, and so on, always turning out of the swath being cut at the end thereof and causing the harvester to make a wide sweep to enable it to enter the next swath around the corner. Such wide corner turns are unavoidable, if the corners are to be harvested clean. With the use of a windrow harvester, such wide corner turns cause the windrow rows to be straggled out objectionably at every turn, making the ensuing pick-up operation difficult, as may be readily appreciated. From this it can be seen that it is desirable that some means be provided for regulating the formation of the windrow so that the corners may be left free and all windrows be laid in straight rows only, at the sides of the field.

Another objection arises in turning corners because of the necessary wide turn the tandem outfit of tractor and windrow harvester must make. It has been found, due to the turning radius of the tractor, that in making the turn, the tractor must run over the windrow previously laid on the preceding swath, causing the tractor wheels to pack down this windrow. This takes place at every corner turn as the tractor must always cut across the previously laid windrow.

Thus, it is the primary object of this invention to provide in a windrow harvester, a means for preventing discharge of grain and the formation of windrows at the will of the operator, such means serving especially to eliminate the formation of windrows at the turns in the corners of the field thus, obviating the necessity of having to run the tractor across previously formed windrows and also subsequently making for easy approach of the pick-up harvester thresher; to provide such means which may be given an operator set to postpone or delay windrow discharge for any predetermined length of travel within certain prescribed limits; to provide in combination with a windrow harvester having a conveyor and retarder plate, a novel clutch control mechanism which, when tripped, automatically functions to stop the conveyor driving mechanism and raise the said plate to prevent or delay discharge of the grain into the windrow for a predetermined length of time; and, generally to improve the structure and enhance the operation of a machine of the kind specified.

Other objects will appear to those skilled in this art as the description of the machine is made more clear.

In an illustrative embodiment as herein shown, these desirable objects are accomplished in a windrow harvester having a platform provided with cutting apparatus and a conveyor which delivers cut grain to a point of discharge rearwardly of a length of said cutting apparatus, there being a stubble deflector and grain discharge retarder plate in back of the cutting apparatus at the discharge point mentioned. The conveyor driving mechanism includes a time or distance control clutch structure which, upon being tripped, causes the conveyor to cease operation, there also being connections acting at this time to raise the retarder plate to support the grain about to be discharged. All other parts of the windrower, such as the cutting apparatus and the usual reel, it will be understood, continue in operation so that the cut grain will be stored on the platform conveyor and plate while the conveyor is idle. When the predetermined time interval has elapsed, or the predetermined distance has been traversed, the said clutch control automatically re-engages the conveyor drive to cause it to operate normally again, and, of course, the retarder plate also is returned to its normal operating position. This action just briefly described may be controlled by the operator to take place as the windrower approaches a corner and is about to leave the swath which it has been cutting preparatory to turning into the next swath. Thus, it is possible to avoid laying windrows in an angular path around field corners, leaving the corners clear and clean, which is highly desirable.

Referring to the drawings:

Figure 1 is a general, top, plan view of the improved windrow harvester;

Figure 1a is a modified view to illustrate how the control of the machine may be made entirely automatic;

Figure 2 is a general, rear, elevational view of the discharge end of the platform of the windrower shown in Figure 1;

Figure 3 is a side elevational view, looking from left to right as seen in Figure 1, of the clutch control mechanism when the same is inactive;

Figure 4 is a view like Figure 3, but showing the parts in active or operating position;

Figure 5 is a similar view, somewhat enlarged, showing the cam adjustment and the relationship of the parts just as the clutch action is initiated after tripping;

Figure 6 is an enlarged plan view of a part of the showing in Figure 1, the showing being large to bring out clearly the details of the clutch organization;

Figure 7 is an enlarged fragment of the view of Figure 3, the cam control element being removed;

Figure 8 is a similar view and showing the parts as in Figure 4, the trip having been unlatched;

Figure 9 is a detail, end, sectional view of the sprocket clutch drive from the reel drive shaft to the conveyor, as seen along line 9—9 of Figure 10 looking in the direction of the arrows;

Figure 10 is a rear, face, detail view, partly broken away, and partly in section, of the structure shown in Figure 9;

Figure 11 is a detail face view of a clutch element; and

Figure 12 is a vertical, central, partly sectional, view through the timing clutch assembly.

The main frame of the windrower comprises a single longitudinal pipe frame member 10, supported at its front end on the spindle 11 of a steering pilot wheel truck 12. In some cases it may be desirable to eliminate this wheel truck and to connect the frame member 10 directly to the drawbar of a tractor. Extending right angularly from the member 10 at its rear end in a grainward direction, and secured to the member 10 by a bracket 13, is a transverse pipe frame support 14 in which is mounted at its stubbleward end a main wheel 15, and at its grainward end, a grain wheel 16. A diagonal brace 17 connected to the members 10 and 14 serves as a cross brace to strengthen the frame. So much as has been described constitutes the main frame of the machine, which, it will be seen, is very simple and strong.

Connected to the under side of the transverse frame pipe 14 at its stubbleward end is a forwardly extending, pivotally mounted arm 18; and grainwardly of the member 18 are two crossed, similarly pivotally mounted diagonal and forwardly extending trussed arms 19 and 20. At the grainward side of the wheel 16 is another forwardly extending, pivotally mounted arm 21 to which the forward end of the truss arm 19 is connected. Extending diagonally forwardly and in a grainward direction is another support arm 22 connected at 23 on the arm 21. These arms 18, 19, 20, 21 and 22 carry at their forward ends a harvester platform 24, which at its front end includes the usual Z-bar 25, and, at its back end, the usual angle bar 26. Connected to the forward end of the Z-bar are the guard fingers 27 and the cutting mechanism 28 of the harvester.

The back end of the platform is provided with the usual upright wind board 29, which at its stubbleward end is formed with an arch 30 to leave an arched passage-way or opening 31 at the stubbleward end of the platform. It is to be understood that the angle bar 26 stops where this arch begins so as to leave an unobstructed opening 31 just described, so that the grain discharged from the conveyor may readily turn into the windrow in formation unimpeded by any obstruction, and also to allow for passage of the machine over the windrow, as will be clear. The front end of this opening is provided with a normally, rearwardly and downwardly sloped plate or board 32 which extends from the Z-bar 25, which carries the board, rearwardly of the cutting mechanism and back a short distance into an opening 33 at the stubbleward end of the platform, said plate preferably presenting a plane area and having its rear edge presenting a straight edge, as shown in Figures 3 and 4. This opening 33 is substantially in line with the passage-way 31 in the backboard 29. The platform 24 carries a conventional form of conveyor apron 34, which is designed to run stubblewardly to discharge the butt ends of its contents when in operation onto the sloped board 32, for a purpose later to be made clear. This conveyor 34 includes at its stubbleward or discharge end a conventional roller 35 which is carried in the end of a gear box 36 extended upwardly and stubblewardly beyond the edge of the arch 30 and into the passage-way 31, for a purpose later to appear.

The platform in any conventional manner carries a reel shaft 37 on which is carried a reel 38, the stubbleward end of the reel shaft carrying a bevel gear 39 driven from a bevel pinion 40 on a telescopic longitudinal shaft 41 mounted in a sleeve 42 on a bracket 43, the rear end of said shaft carrying a sprocket wheel 44 keyed to the shaft and driven from a chain 45 deriving its rotation from a sprocket wheel 46 on a longitudinal shaft 47. This shaft 47 at its front end carries a crank 48 connected to a pitman 49 for reciprocating the cutting mechanism 28 in the usual manner. The rear end of the shaft 47 extends into a gear box 50 in which are gears (not shown), connected to a forwardly extending counter-shaft 51 operated from a bevel pinion 52 geared to a bevel gear 53 carried on a shaft (not shown) in a bracket 54 supported on the under side of the frame member 10. This shaft (not shown) is driven by chain and sprocket gear connections 55 in any conventional manner from the main wheel 15.

A brake drum 56 is also shown for braking the machine by means of a brake lever 57 connected by a link 58 to a brake mechanism in the drum 56, as indicated. A clutch lever is shown at 59 at the front end of the frame member 10 and it has a link connection 60 to a clutch control rock arm 61 for controlling a clutch (not shown) in the gear box 50, there being a spring 62 for normally holding the clutch in its driving position, as is common in this art. An operator's seat is arranged at 63 on the front end of the frame 10 accessible to these controls.

The conveyor apron 34 is driven from the shaft 41 by means of a sprocket wheel 64 loose on the shaft 44 and a chain 65, which is trained around idler sprockets 66 and also a driving sprocket 67 on a shaft 68, which shaft 68 operates a gear train 69, indicated in dotted lines in Figure 2, to impart the proper direction of rotation to the roller 35, as will be understood. The grainward end of this apron is trained around an idler roller in the usual manner, which is not shown.

A lever 70 is arranged adjacent the seat of the operator and has a connection, not shown, to the front stubbleward corner of the platform for enabling the operator to raise or lower the platform to accommodate the cutting apparatus to varying heights of grain, as is usual in this art. As the platform is heavy, it is usual to provide a counterbalance mechanism to assist the operator in moving the lever 70. Such means is conventional, and it will, therefore, not be shown or described.

One of the objects of the invention was to stop for a predetermined time, the discharge of grain from the conveyor 34 into the windrow, as for example when turning corners. The mechanism which causes this to take place will now be described.

Between the sprocket wheel 44 fast on the shaft 41, and the sprocket wheel 64 loose on the shaft 41, is a conventional form of clutch functioning as a normal drive transmitter, but adapted to be tripped so that the loose sprocket wheel 64 may be held idle to stop the conveyor 34. Reference is to be made to Figures 9 and 10 illustrating this clutch, which includes a hub part 71 integral with the constantly rotating sprocket wheel 44, said hub projecting into a drum 72 of the intermittently rotating sprocket wheel 64. The inside of the hub 71 is provided with spaced stops 73. The drum 72 of the intermittent part has a hub carrying two spaced extensions 74 in which is carried a pin 75, upon which is rockably mounted a dog 76 extended out radially through the drum as shown, said dog including a projection carrying a roller 77 normally pressed by a spring 78 to hold the roller locked against one of the stops 73. Thus, it will be seen that the dog 76, due to the spring 78, normally has its roller 77 locked against a stop 73, which causes the two sprocket wheels 44 and 64 to rotate together, in unison, to move the conveyor 34.

Operator controlled mechanism has been provided, however, to trip the dog 76, thereby releasing the roller 77 to disconnect the loose sprocket wheel 64 from the constantly turning sprocket wheel 44, whereupon the said loose sprocket is held against rotation for a predetermined interval to stop the conveyor 34. Such delay control structure will now be described.

As shown best in Figures 6, 7 and 8, the reel drive shaft 41, which turns constantly, has fast thereon, a short distance forwardly of the clutch structure just described, a worm gear 79 meshing with and driving a relatively large, slowly turning, worm pinion 80. See also Figure 12. This pinion 80 has a hub extension 81, similar to the part 71 heretofore described, and provided with internal stops 82. The pinion 80 is a constantly turning one, the same being loosely mounted on a stationary, transverse stub shaft 83 mounted in the bracket 43 heretofore described. The gear 80 constitutes the constantly rotating part of the delay clutch now being described.

The end of the shaft 83, in a stubbleward direction, spaced from the hub extension 81, loosely carries a time or distance control cam disk 84 having a dwell 85 between it and a cam sector plate 86 adjustably bolted by bolts 87 to said cam 84, to vary the width of the dwell 85 or the effective periphery of the cam for a purpose later to be made clear. Holes 88 are provided for this adjustment. Figure 5 indicates the range of adjustment in dotted lines. By means of bolts 89, the circular cam disk 84 is secured to a clutch dog carrier plate 90, said plate having two spaced, radially extending ears 91 carrying a pin 91', upon which is pivotally mounted a dog 92 carrying a roller 93 normally pressed in engagement with one of the stops 82 of the constantly turning hub part 81 of the gear 80, by means of a spring, not shown, such spring being like the spring 78 heretofore described in connection with the conveyor drive clutch. The dog 92 also includes an extension 94. The bolts 89, heretofore mentioned, also pass through and fasten to a disk 95, having a peripheral notch 96 and an inside opening 97 to fit over the ear extensions 91 already described. See Figures 11 and 12. Thus, it will be seen that the cam 84, the plate 90, and notched disk 95 are a unit, loose on the shaft 83, and that these parts constitute an intermittently rotating clutch part, as will presently appear. A clutch control lever 98 is pivoted intermediately of its ends at 99 to the bracket 43, the lower end of the lever having a pull rope 100 connected thereto, while its upper end carries an offset roller 101 designed to engage in the notch 96 to stop the plate 95 and also to protrude into the path of movement of the dog extension 94. When this takes place, the dog roller 93 is tripped out of engagement with one of the stops 82, thereby freeing the cam 84 and its connected parts from the gear 80, so that said gear turns alone and the cam and its parts remain idle. The rope 100 has its opposite end mounted in a convenient position adjacent the operator's seat 63, as will be understood. This normal operating position of the parts is illustrated in Figure 7. A spring 102 connected to the lever and to the frame assures this normal lock position of the lever 98.

The function of the cam 84, 86 is to regulate the operation of the conveyor driving clutch and to raise and lower the windrow former plate 32 in back of the cutting mechanism adjacent the discharge end of said conveyor 34. This structure will now be described.

As shown in Figures 3, 4, 5 and 6, the bracket 43 has an upright extension including a horizontal sleeve 103 in which is slidably arranged a trip arm 104 connected by a pin 105 to a curved lever 106 adjacent its fulcrum 107 on the bracket extension 43. This trip arm 104 functions at certain times to stop the trip 76 for the conveyor drive clutch, as will presently be made clear. The curved lever 106 carries an offset roller 108 designed to ride the periphery of the cam 84, 86, said lever terminating in a forwardly extending straight portion 109, having at its end an eye 110, to which is attached a depending chain 111. See Figures 3 and 4. The bottom end of the chain is attached to the end of a crank arm 112 formed at the stubbleward end of a shaft 113, (see also Figure 2), journaled for rocking movement in spaced brackets 114 on the under side of the z-bar 25. The rockshaft 113 at its other end carries another crank arm 115 upon which rests the windrow former plate 32. The plate 32 is pivotally connected to the z-bar 25 by a hinge joint 116, thus permitting the plate 32 to be raised or lowered. Thus, the pivotal connection of the plate 32 to its support, combined with the flexible element 111, makes the plate capable of being angularly adjusted with respect to its support.

In Figure 1a, a modification is shown to show how the machine can be made entirely automatic and controlled by turning movement thereof to pull the rope 100. Instead of having this rope at the seat 63, it may be connected to an upright post 116' adapted to be carried in a socket 117 at either end of the axle of the tongue truck 12. The upper end of this post may carry an eye 118, in which is slidably fitted a short rod 119 having a stop 120 and a coil spring 121. The rope 100 is attached to the rod as shown, and the spring takes up slack in the rope. As the tongue truck angles, obviously the rope is pulled and the lever 98 will be released to cause the cam structure 84, 86 to turn. The operation of the machine will now be summarized.

The machine is pulled by tractor or animal power. As it moves, the machine having been thrown into gear by the clutch lever 59, the ground, main wheel 15 drives the parts, such as the cutting mechanism, the reel, and the conveyor 34. The lever 98, because of the spring 102, normally locks the cam 84, 86 against turning movement and, as a result, the trip 104 is held out of the path of the dog 76, thus causing the sprocket wheel 64 to turn with the sprocket wheel 114 to drive the conveyor 34. The retarder or windrow former plate is held down in its normal working position, as shown in Figure 3.

The machine enters the rectangular field and travels straight away along one side thereof, the knife and reel cooperating in the usual manner to lay the cut grain back onto the conveyor 34, which is running in a stubbleward direction. The grain is discharged from this conveyor along a length of the knife and rearwardly thereof onto the plate 32, which is all the while bending ahead the field stubble in its path and retarding the grain from the conveyor to spend the force of discharge thereof, so that a windrow is formed and laid on the bent over stubble with the heads of the grain up and arranged shingle fashion, best to expose them to sun and wind to ripen evenly.

Let us assume now that it is required to turn at the end of the field. As has been stated, it is desirable to cut all of the grain in the corner, but it is not wanted to form the windrow around the turn. The cam 84, 86 constitutes a timing mechanism, which, as later will be explained, has been set to stop the driving mechanism for the conveyor 34, while the machine travels a distance of thirty-five feet, let us say, which will be sufficient delay to allow the machine to make the turn without forming the windrow in the corner and permit the machine once more to travel on the straight-away by the time the conveyor 34 resumes operation to form the windrow again. Accordingly, as the machine is about to make the corner turn, the operator, from his seat 63, pulls the rope 100, as shown in Figure 7, to release the roller 101 from the notch 96 in the plate 95, and also to move said roller out of the position where it holds extension 94 of the dog 92. This released position of the parts is shown in Figure 8.

The gear 80 which is turning continuously now is caused to be clutched to the cam 84, 86 through plate 95, which results in slow rotation for said cam. As the cam turns slowly and clockwise, as viewed in Figure 8, the roller 108 is caused to ride up the straight side of the cam dwell until said roller is removed from the dwell and then rides the periphery of the cam, which, being high, has raised the lever 109, as shown in Figure 4, to raise the plate 32. This plate now functions to support the grain cut by that length of the cutting mechanism in advance thereof. At the same time that the lever 109 moves upwardly, the slide 104 moves into the path of movement of the dog projection 76 to disconnect the sprocket wheel 64 from the constantly turning sprocket wheel 44. Thus the sprocket wheel 64 is held idle to stop the drive of the conveyor 34, which, of course, also stops. As the drive to the cutting apparatus is through the shaft 47, the grain continues to be cut. The reel 38 also continues in operation because the reel drive shaft 41 always rotates. Thus, cut grain accumulates on the stationary conveyor during this delay in the formation of the windrow. As the machine traverses the predetermined thirty five feet of travel, the cam 84, 86 has made one complete revolution, causing the roller 108 to drop back into the cam dwell 85. As the lever 109 also must drop, the slide 104 withdraws from the dog projection 76 to cause the loose sprocket 64 to turn with the fast sprocket 44 to operate the conveyor 34 once more to discharge the accumulated load of grain thereon. At the same instant, the plate 32 returns by gravity to its normal operating position, and the spring 102 pulls the lever 98 so that its roller 101 engages the notch 96 and dog projection 94 to disconnect the cam 84, 86 from the gear 80 to stop said cam from further rotation, as will be understood. The machine parts are now all back, by an entirely automatic structure, to normal operating condition for straight-away cutting and formation of the windrow.

In the preferred embodiment, the delay action described is at the will of the operator who must pull the rope 100 at the desired time from his seat 63 to initiate this action. The return of the parts to normal operation is, of course, fully automatic and independent of the operator. The mechanism can very easily be made entirely automatic by connecting the rope to the front steering truck in the manner shown in Figure 1a, so that angling of this truck on the corner turn will pull the rope and start the cam 84, 86.

The cam 84, 86 in practice is best when set for about thirty-five feet. This is accomplished by proportioning the length of periphery of the cam and the time interval of one revolution thereof to a distance of thirty-five feet of machine travel. The bolts 87 and holes 88 (see Figure 5) permit a setting of the cam sector 86 relative to the cam 84 to shorten or lengthen the dwell 85 or conversely, the effective length of periphery of the cam for this purpose, as will be clear.

From this detailed description, it can now be appreciated that the improvements disclosed accomplish all of the desirable objects heretofore recited.

It is to be understood that only an illustrative embodiment of the invention has been disclosed, and that the same is susceptible of change and modification in many ways by those skilled in this art without departing from the spirit and scope of the invention as is indicated in the appended claims.

What is claimed is:

1. In a harvester having a cutting mechanism and a conveyor, means for operating said conveyor, and manually initiated, automatically acting means for interrupting the operation of the conveyor for a predetermined interval and then starting the same again.

2. In a harvester having a cutting mechanism and a conveyor, means for operating said conveyor, means for interrupting the operation of the conveyor for a predetermined interval while the cutting mechanism continues in operation, and means for automatically controlling the period of said interval.

3. In a harvester having a platform, cutting mechanism thereon, a reel therefor, a conveyor thereon, means for interrupting the operation of the conveyor for a certain interval of time while the cutting mechanism and reel continue in operation, and automatically acting means to start the conveyor again at the end of said interval.

4. In a harvester having a cutting mechanism and a conveyor, driving connections for said parts, a clutch for controlling the conveyor drive, and a timing mechanism for actuating the clutch.

5. In a harvester having a cutting mechanism and a conveyor, driving means including a clutch through which the conveyor is driven, means for disconnecting the clutch to stop the conveyor, and automatically acting means to connect the clutch again to drive the conveyor after lapse of a predetermined time interval.

6. In a harvester having a cutting mechanism and a conveyor, driving means including a clutch through which the conveyor is driven, means for connecting and disconnecting the clutch, and a delay clutch for controlling the first clutch.

7. In a harvester having a conveyor, driving mechanism therefor including a clutch, and a delay clutch governing the first clutch to stop and start the conveyor.

8. In a harvester having a conveyor, driving mechanism therefor including a clutch, a second clutch, means controlled by the second clutch to disconnect and connect the first clutch, and timing means governing the operation of the second clutch.

9. In a harvester having a conveyor, driving mechanism for the conveyor including a clutch, a second clutch, a cam operated by the second clutch, and means controlled by the cam for governing the operation of the first clutch.

10. In a harvester having a conveyor, driving mechanism including a clutch operating the conveyor, cam controlled means for disconnecting and connecting the clutch to stop and start the conveyor, and means for adjusting said means to govern the time interval between said stopping and starting.

11. In a windrow harvester having cutting mechanism, a conveyor discharging grain received from the cutting mechanism, a pivoted retarder for the grain discharged by the conveyor, and means for stopping the conveyor and raising said retarder.

12. In a windrow harvester having cutting mechanism, a conveyor receiving grain therefrom to discharge the same in a windrow, a retarder for receiving the discharged grain and laying it in the field, and means to stop the conveyor and raise the retarder to prevent laying of the windrow.

13. In a windrow harvester having cutting mechanism, a conveyor receiving grain therefrom to discharge the same, a retarder plate in back of the cutting mechanism for receiving the grain and laying it in the field, and means to stop the conveyor and raise said plate momentarily while the cutting mechanism continues in operation.

14. In a windrow harvester, cutting mechanism, a conveyor, a discharge retarder plate, driving connections for the conveyor including a clutch, and timing mechanism for engaging and disengaging the clutch to start and stop the conveyor, said mechanism including means for raising the plate when the conveyor stops.

15. In a windrow harvester, cutting mechanism, a conveyor, a discharge retarder plate in back of the cutting mechanism, driving connections for the conveyor including a clutch, and a delay clutch mechanism for starting and stopping the first clutch to start and stop the conveyor, said mechanism including means for raising the plate when the conveyor is stopped.

16. In a windrow harvester, cutting mechanism, a conveyor discharging the cut grain, a retarder receiving the grain to lay it in a windrow, driving connections including a clutch for the conveyor, cam controlled means for connecting and disconnecting the clutch and for raising the retarder when the clutch is disconnected, and means for adjusting the cam to predetermine the time interval of clutch disconnection.

17. The combination with a windrow harvester having cutting mechanism and a conveyor, of means for driving the cutting mechanism continuously when the harvester is operating, and timing means acting when tripped into operation to stop the conveyor for a predetermined interval of time and then starting the same again.

18. The combination with a windrow harvester having a sickle, a reel, and a conveyor, of means for driving the sickle and reel continuously when the harvester is operating, and timing means acting when tripped into operation for holding the conveyor idle for a predetermined interval.

19. The combination with a windrow harvester having a sickle, a conveyor, and a retarder for laying grain discharged from the conveyor in a windrow, of means acting when tripped into operation for holding the conveyor idle for a predetermined interval and for raising the retarder when the conveyor is idle while the sickle continues in operation.

20. In a harvester, a conveyor for discharging cut grain, and means controlled automatically by a change in direction of travel for holding the conveyor idle for a predetermined interval.

21. A windrow harvester comprising, in combination, a sickle for cutting a crop, means to move the cut crop to a point of discharge, a stubble bending plate located to receive the discharged crop and lay it in a windrow on the bent stubble, means for pivotally mounting the plate in such location, and means to adjust the tilt of the plate and hold it against downward movement beyond a normally set position, said plate embodying a straight edge for pressing down the tops only of the stubble so that said pressed over tops will be maintained in an elevated position of substantially uniform height, whereby to form a raised springy stubble support capable of holding a windrow in aerating position above the ground.

22. A windrow harvester comprising, in combination, a sickle for cutting a crop, means to move the cut crop to a point of discharge and for discharging the same in a windrow in back of and in a path narrower than the length of the sickle and between the ends thereof, means pivotally carrying said plate at the point of discharge, and adjusting means to hold the plate in a set position against downward pivoting movement, the plate receiving the cut crop and laying it in a windrow.

23. A windrow harvester comprising, in combination, a sickle for cutting a crop, means to move the cut crop to a point of discharge and for discharging the same in a windrow in back of and in a path narrower than the length of the sickle and between the ends thereof, a pivoted plate at said point of discharge to receive and lay the windrow, and means whereby said plate may be held in different positions.

24. A windrow harvester comprising, in combination, a sickle for cutting a crop, means to move the cut crop to a point of discharge and for discharging the same in a windrow in back of and in a path narrower than the length of the sickle and between the ends thereof, a normally inclined pivoted plate at said point of discharge to receive and lay the windrow, and means whereby said plate may be held in different positions to vary its inclination.

25. A windrow harvester comprising, in combination, a support, a sickle for cutting a crop, means to move the cut crop to a point of discharge, and a suitable deflecting member hingedly carried by the support and by means enabling angular adjustment of the member relative to the support at said point of discharge to receive and lay the crop in a windrow, said stubble deflecting member embodying a straight edge acting to press down the tops only of the stubble to a substantially uniform height along transverse lines, whereby to form a raised springy stubble mat capable of holding a windrow in aerating position above the ground.

26. A windrow harvester comprising, in combination, a sickle for cutting a crop, means to move the cut crop to a point of discharge, a support, retarder means pivotally carried by the support for angular adjustment relative thereto between the ends and in back of the sickle to receive and lay the crop in a windrow, and means to effect such adjustment.

27. A windrow harvester comprising, in combination, a sickle for cutting a crop, means to move the cut crop to a point of discharge, a support, and a plate hingedly carried by the support and by means enabling angular adjustment of the plate with respect to the support at said point of discharge to receive and lay the crop in a windrow, said plate embodying a straight edge acting to press down the tops only of stubble in its path to form a raised springy stubble mat capable of holding a windrow in aerating position above the ground.

EDWARD A. JOHNSTON.
ALEXUS C. LINDGREN.